United States Patent
Kray et al.

(10) Patent No.: US 10,837,457 B2
(45) Date of Patent: Nov. 17, 2020

(54) COMPOSITE BLADE ROOT STRESS REDUCING SHIM

(71) Applicant: GENERAL ELECTRIC COMPANY, Schenectady, NY (US)

(72) Inventors: Nicholas Joseph Kray, Mason, OH (US); Qiang Li, Mason, OH (US)

(73) Assignee: General Electric Company, Schenectady, NY (US)

( * ) Notice: Subject to any disclaimer, the term of this patent is extended or adjusted under 35 U.S.C. 154(b) by 533 days.

(21) Appl. No.: 15/111,199

(22) PCT Filed: Nov. 17, 2014

(86) PCT No.: PCT/US2014/065967
§ 371 (c)(1),
(2) Date: Jul. 13, 2016

(87) PCT Pub. No.: WO2015/108616
PCT Pub. Date: Jul. 23, 2015

(65) Prior Publication Data
US 2016/0333889 A1 Nov. 17, 2016

Related U.S. Application Data

(60) Provisional application No. 61/928,118, filed on Jan. 16, 2014.

(51) Int. Cl.
*F04D 29/34* (2006.01)
*F04D 29/32* (2006.01)
(Continued)

(52) U.S. Cl.
CPC .............. *F04D 29/34* (2013.01); *F01D 5/282* (2013.01); *F01D 5/288* (2013.01); *F01D 5/3007* (2013.01);
(Continued)

(58) Field of Classification Search
CPC ............................... F01D 5/288; F01D 5/3092
See application file for complete search history.

(56) References Cited

U.S. PATENT DOCUMENTS

| | | | |
|---|---|---|---|
| 3,752,600 | A | 8/1973 | Walsh et al. |
| 4,040,770 | A | 8/1977 | Carlson |

(Continued)

FOREIGN PATENT DOCUMENTS

| CN | 1920259 A | 2/2007 |
|---|---|---|
| DE | 102005008509 A1 | 9/2005 |

(Continued)

OTHER PUBLICATIONS

International Search Report and Written Opinion dated Apr. 17, 2015 which was issued in connection with PCT Patent Application No. PCT/US2014/065967 which was filed on Nov. 17, 2014.

(Continued)

*Primary Examiner* — Nathaniel E Wiehe
*Assistant Examiner* — Brian O Peters
(74) *Attorney, Agent, or Firm* — Dority & Manning, P.A.

(57) ABSTRACT

A gas turbine engine blade root shim for use between a composite blade root and a wall of a slot in a rotor includes a longitudinally extending base having distal first and second transversely spaced apart ends, first and second longitudinally extending legs acutely angled inwardly towards the base from the first and second ends, and one or more apertures disposed through each of the longitudinally extending first and second legs. Apertures may include rectangular slots having rounded edges along the first and second outwardly facing surfaces of the first and second legs respectively and/or rounded corners between the first and second outwardly facing surfaces and the first and second inwardly facing surfaces of the first and second legs. Low coefficient of friction coatings may be disposed on out- (Continued)

wardly facing surfaces, of the legs. Coatings may include polytetrafluoroethylene powder dispersed in a resin binder and other coatings having polytetrafluoroethylene.

21 Claims, 8 Drawing Sheets

(51) Int. Cl.
*F04D 29/02* (2006.01)
*F01D 5/28* (2006.01)
*F01D 5/30* (2006.01)

(52) U.S. Cl.
CPC ......... *F01D 5/3092* (2013.01); *F04D 29/023* (2013.01); *F04D 29/325* (2013.01); *Y02T 50/60* (2013.01)

(56) References Cited

U.S. PATENT DOCUMENTS

| | | | |
|---|---|---|---|
| 5,222,297 A | 6/1993 | Graff et al. | |
| 5,279,892 A | 1/1994 | Baldwin et al. | |
| 5,292,231 A | 3/1994 | Lauzeille | |
| 5,375,978 A | 12/1994 | Evans et al. | |
| 5,573,377 A | 11/1996 | Bond et al. | |
| 5,785,498 A | 7/1998 | Quinn et al. | |
| 5,939,006 A | 8/1999 | Wang et al. | |
| 6,290,466 B1 | 9/2001 | Ravenhall et al. | |
| 6,431,835 B1 | 8/2002 | Kolodziej et al. | |
| 6,860,772 B2 | 3/2005 | Kabakov | |
| 7,198,463 B2 | 4/2007 | Kanebako et al. | |
| 7,491,032 B1 | 2/2009 | Powell | |
| 7,575,417 B2 | 8/2009 | Finn et al. | |
| 7,794,197 B2 | 9/2010 | Thompson et al. | |
| 7,837,446 B2 | 11/2010 | McMillan | |
| 8,033,789 B2 | 10/2011 | Read et al. | |
| 8,038,408 B2 | 10/2011 | McMillan | |
| 8,075,274 B2 | 12/2011 | Carvalho | |
| 8,100,662 B2 | 1/2012 | Schreiber et al. | |
| 9,103,220 B2 * | 8/2015 | Garin | F01D 5/081 |
| 2007/0048142 A1 | 3/2007 | Dambrine et al. | |
| 2009/0025365 A1 | 1/2009 | Schilling et al. | |
| 2009/0035131 A1 | 2/2009 | McMillan | |
| 2010/0229334 A1 | 9/2010 | Conrad | |
| 2010/0296939 A1 | 11/2010 | Jevons | |
| 2010/0296942 A1 | 11/2010 | Jevons | |
| 2011/0027096 A1 | 2/2011 | Northfield | |
| 2011/0049297 A1 | 3/2011 | Jevons et al. | |
| 2011/0070092 A1 | 3/2011 | Gerlach | |
| 2011/0129348 A1 | 6/2011 | Parkin et al. | |
| 2011/0176927 A1 | 7/2011 | Alexander et al. | |
| 2011/0182741 A1 | 7/2011 | Alexander | |
| 2011/0182743 A1 | 7/2011 | Naik | |
| 2011/0194941 A1 | 8/2011 | Parkin et al. | |
| 2011/0217166 A1 | 9/2011 | McMillan | |
| 2011/0217170 A1 | 9/2011 | Buffone et al. | |
| 2011/0217517 A1 | 9/2011 | McMillan et al. | |
| 2011/0223027 A1 | 9/2011 | Klinetob et al. | |
| 2012/0003100 A1 | 1/2012 | James et al. | |
| 2012/0082551 A1 | 4/2012 | Macchia et al. | |
| 2012/0263595 A1 * | 10/2012 | Evans | F01D 5/3092 416/189 |

FOREIGN PATENT DOCUMENTS

| | | |
|---|---|---|
| EP | 1085172 A2 | 3/2001 |
| EP | 1443180 A2 | 8/2004 |
| FR | 2959271 | 4/2010 |
| JP | 09-250303 A | 9/1997 |

OTHER PUBLICATIONS

Unofficial English translation of Chinese Office Action issued in connection with corresponding CN Application No. 201480073382.9 dated Dec. 5, 2016.

\* cited by examiner

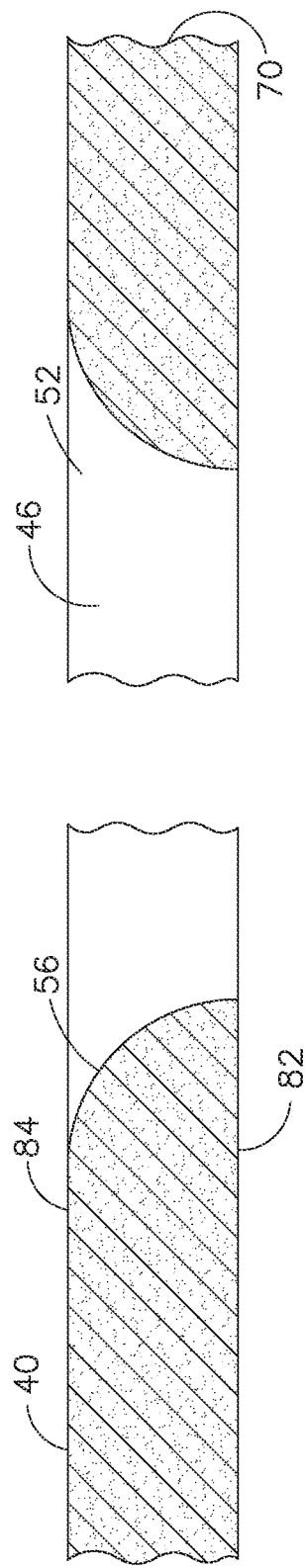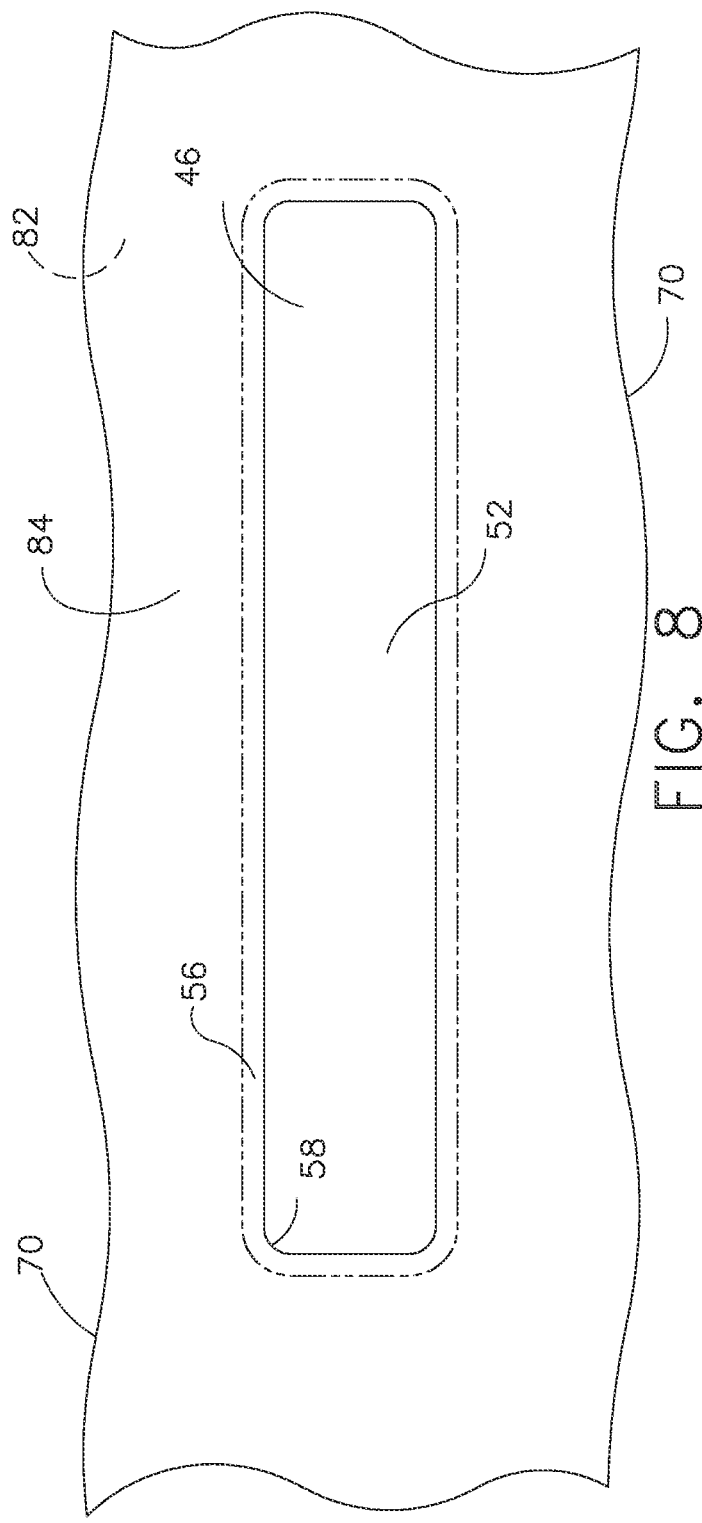
FIG. 7
FIG. 8

COMPOSITE BLADE ROOT STRESS REDUCING SHIM

BACKGROUND

Technical Field

Embodiments of the present invention relate to root attachment of composite blades to a rotor of gas turbine engines and, more particularly, to blade root shims for composite blade composite roots.

Gas turbine engine composite fan blades have dovetails or roots carried by a slot in a metal disk or drum rotor. During operation, under high compressive loads and relative movement between the root and a wall of the slot (often referred to as a disk post), wear and fretting erosion have been observed, particularly in the blade dovetail roots carried by the rotor. Composite blades made of stacked or layed-up plies of a reinforced polymeric material, for example, an epoxy matrix reinforced with a fiber structure such graphite, glass, boron, etc, as is well known in the art. Examples of such blades are described in U.S. Pat. Nos. 3,752,600; 4,040,770; and 5,292,231. Generally, in such known structures, it has been common practice to dispose metal outserts or metal shells between the blade dovetail root and the dovetail slot of the carrying member, in the splayed design conveniently used in such assemblies. The contact between the metal slot of the carrying member and the metal outsert or shell at the juncture between the blade and the slot has resulted in wear and fretting erosion at that interface.

In order to overcome such fretting and subsequent erosion, a composite blade root and a rotor assembly was developed as described in U.S. Pat. No. 5,573,377, entitled "Assembly Of A Composite Blade Root And A Rotor", which is assigned to the General Electric Company, the same assignee as the assignee of this patent and which is hereby incorporated herein by reference. U.S. Pat. No. 5,573,377 discloses an assembly of a plurality of composite blades including blade roots carried by blade root receiving slots in the rotor wherein the slot has a slot wall with a radially outward portion which, when assembled, diverges from a spaced apart juxtaposed blade root pressure face radially outer surface in an amount which is a function of a predetermined amount of centrifugal loading on the blade during operation of the assembly, to allow at least a portion of the radially outer surface of the root pressure face to be in contact with the slot wall radially outward surface during operation.

Root outer pads have a plurality of substantially non-metallic, composite plies, rather than metal, bonded with the airfoil structural plies extending into the blade root. A low friction wear coat to help reduce friction induced stresses in the blade root is applied to a root outer pressure face. The wear coat can be applied to and cured on the pressure face and examples of such a coating material include self lubricating films or cloths such as a fabric weave of polytetrafluoroethylene (PTFE) fibers such as Teflon material fibers, glass type fibers such as Kevlar, and organic aramid fibers such as Nomex material fibers.

Also, a spray of Teflon material or other forms of PTFE material can be used. The low friction coating helps prevent the blades from becoming locked in the rotor slot during deceleration of the rotor during operation. An additional benefit from use of the low friction coating in this combination is the ability of the blade root to slip at a predictable loading condition and provide damping for the blade during resonant crossings and potential blade instabilities, due to the relative motion between the blade base and the rotor slot wall.

A shim disposed between the low friction coat and a slot provides a desired hardness and surface finish to obtain still more improved performance from the low friction wear coat material. The shim is particularly important where the slot wall is a titanium alloy in which desired wear properties are not always achievable. The shim extends the life of the wear coat and prevents wear from occurring to the slot wall positioned between the wear coat and the slot wall and is both replaceable and removable from the rotor dovetail. The shim can be made of a single material such as steel, titanium or a titanium alloy or it can be a single material having a coating such as copper or a copper alloy on one side.

U.S. Pat. No. 6,290,466 to Ravenhall, et al., issued Sep. 18, 2001 and discloses a gas turbine engine blade root shim for use between a composite blade root and a wall of a slot for receiving the root in a rotor of the engine. An exemplary embodiment of the shim includes a longitudinally extending base having distal first and second transversely spaced apart ends, first and second longitudinally extending legs acutely angled inwardly towards the base from the first and second ends, and first and second low coefficient of friction coatings on first and second outwardly facing surfaces of the first and second legs respectively. Among coatings suitable for use are polytetrafluoroethylene powder dispersed in a resin binder and other coatings which include polytetrafluoroethylene.

A low friction wear coat is disposed on the root outer pressure face between the pressure face and the slot wall and the shim carried by the slot wall is disposed between the low friction wear coat and the slot wall. The shim having the low coefficient of friction coating on an outwardly facing surface of the shim is in contact with the low friction wear coat. The low coefficient of friction coatings on the legs of the shim allow the blade roots to properly seat in the slots of the rotor obviating the need to rebalance the rotor during engine assembly or reassembly and testing. U.S. Pat. No. 6,290,466 is assigned to the General Electric Company, the same assignee as the assignee of this patent and is hereby incorporated herein by reference.

Composite fan blades in the aircraft engine are subject to large centrifugal loads under steady-state operating conditions. Stress concentration between the bottom end of the shank and the top end of the dovetail may be a limiting factor for composite fan blade life and durability. The locations of stress concentration are consistent with substantially all legacy composite fan blades. It is therefore desirable to reduce the stress concentration and improve fatigue and durability of the composite fan blade.

BRIEF DESCRIPTION

A gas turbine engine blade root shim 40 includes a longitudinally extending base 60 having distal first and second transversely spaced apart ends 64, 68, transversely spaced apart first and second longitudinally extending legs 70, 72 extending away from the base 60 and acutely angled inwardly towards the base 60 from the first and second ends 64, 68 respectively, and one or more apertures 46 disposed through each of the longitudinally extending first and second legs 70, 72.

The shim 40 may have first and second low coefficient of friction coatings 78, 80 on first and second outwardly facing surfaces 82, 84 of the longitudinally extending first and second legs 70, 72. The coatings may have polytetrafluoroethylene powder dispersed in a resin binder. The coatings may include polytetrafluoroethylene.

The apertures 46 may have rounded edges 56 along the first and second outwardly facing surfaces 82, 84 of the first and second legs 70, 72 respectively. The apertures 46 may have rounded corners 58 between the first and second outwardly facing surfaces 82, 84 and the first and second inwardly facing surfaces 86, 88 respectively of the first and second legs 70, 72 respectively.

The apertures 46 may include longitudinally extending slots 52, 54 in each of the longitudinally extending first and second legs 70, 72. The slots 52, 54 may be longitudinally elongated and extending rectangular slots 52, 54.

A rotor assembly includes a plurality of composite fan blades 10 carried by a rotor 12 as a support member, each of the composite blades 10 including a plurality of bonded composite airfoil plies 20 of an airfoil 16 and a blade root 18 shaped to be carried by the rotor 12. The rotor 12 includes a plurality of circumferentially disposed blade root receiving slots 14, each of the slots 14 having a slot wall 34 at least a portion of which is shaped to receive the blade root 18, and the slot wall 34 shaped to receive and carry at least a portion of a root outer pressure face 32 of the blade root 18. The longitudinally extending shim 40 is carried by the slot wall 34 and includes the transversely spaced apart first and second longitudinally extending legs 70, 72 extending away from the longitudinally extending base 60 and acutely angled inwardly towards the base 60 from the first and second ends 64, 68 respectively. The one or more apertures 46 are disposed through each of the longitudinally extending first and second legs 70, 72.

BRIEF DESCRIPTION OF THE DRAWINGS

The novel features believed characteristic of the novel shim presented herein are set forth below and are more particularly described in conjunction with the accompanying drawings in which:

FIG. 7 is a cross sectional view illustration of the aperture in the shim through 7-7 in FIG. 6.

FIG. 8 is a cross sectional view illustration of the aperture in the shim through 8-8 in FIG. 6.

DETAILED DESCRIPTION

Figure 1:
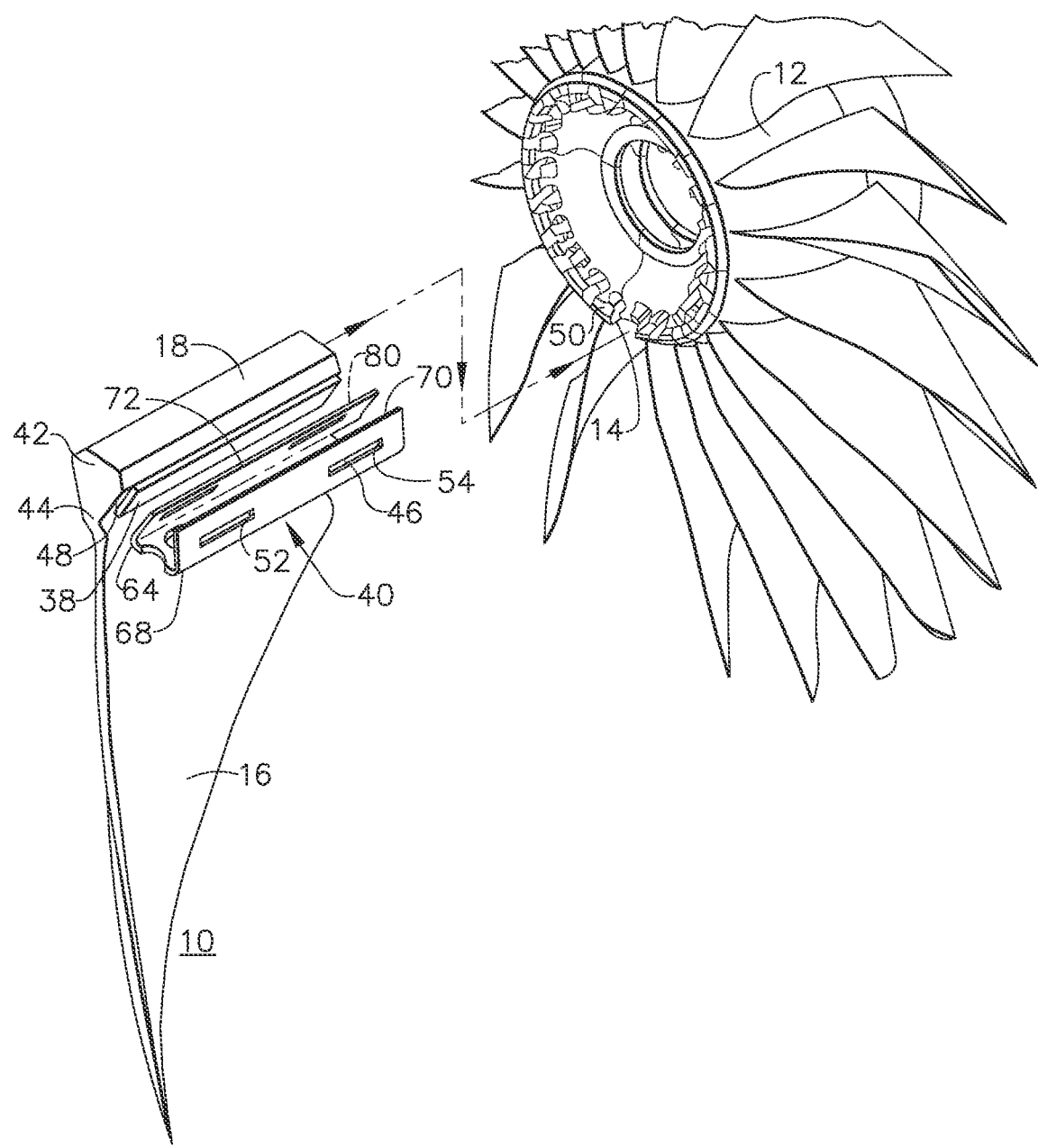
FIG. 1 is an exploded view illustration of a composite fan blade and longitudinally extending stress relieving apertures in a shim assembled in a dovetail slot of a gas turbine engine rotor.
Figure 2:
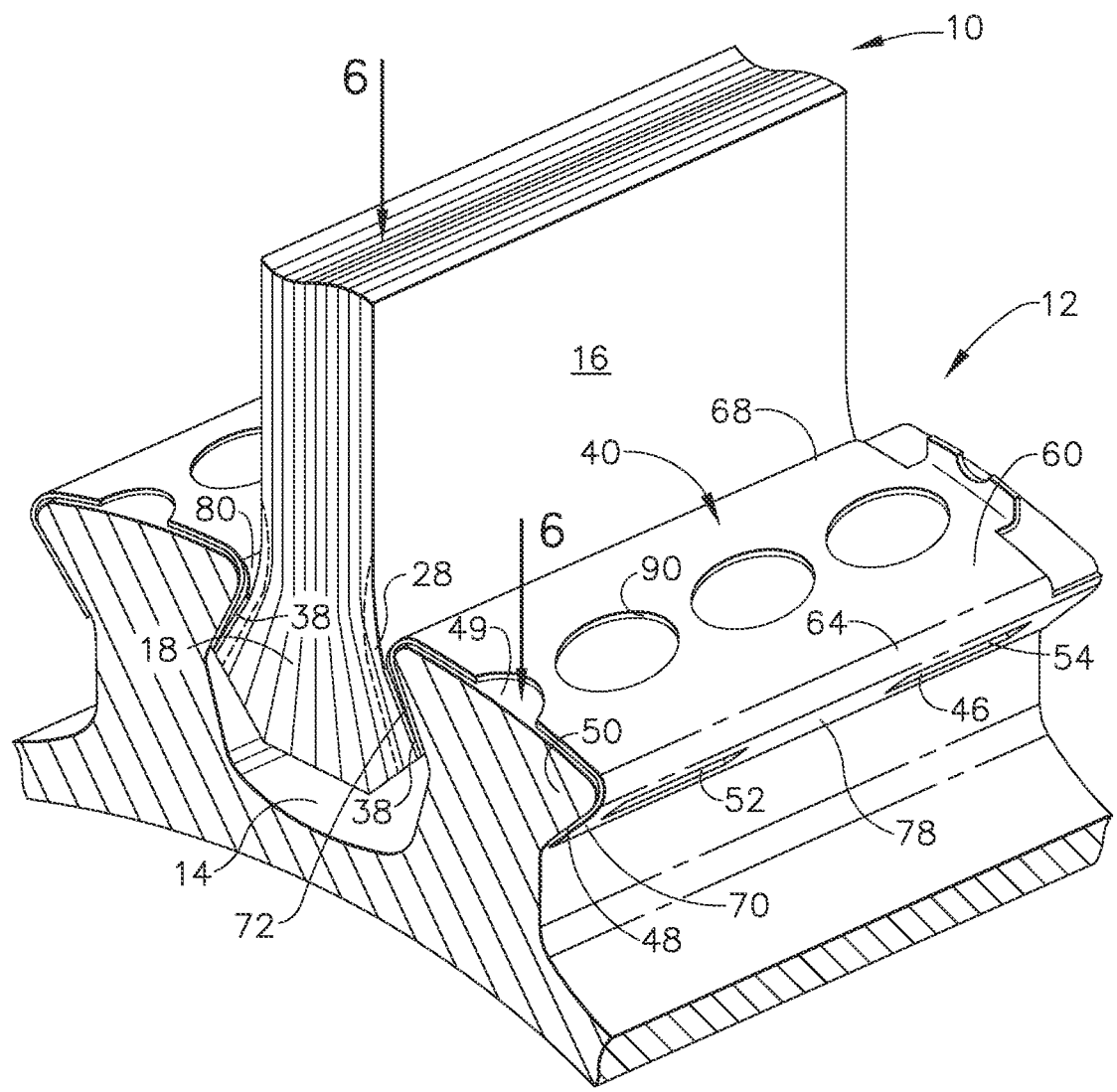
FIG. 2 is a fragmentary perspective partially sectional view illustration of the composite blade and shim in the assembly of FIG. 1.
Figure 3:
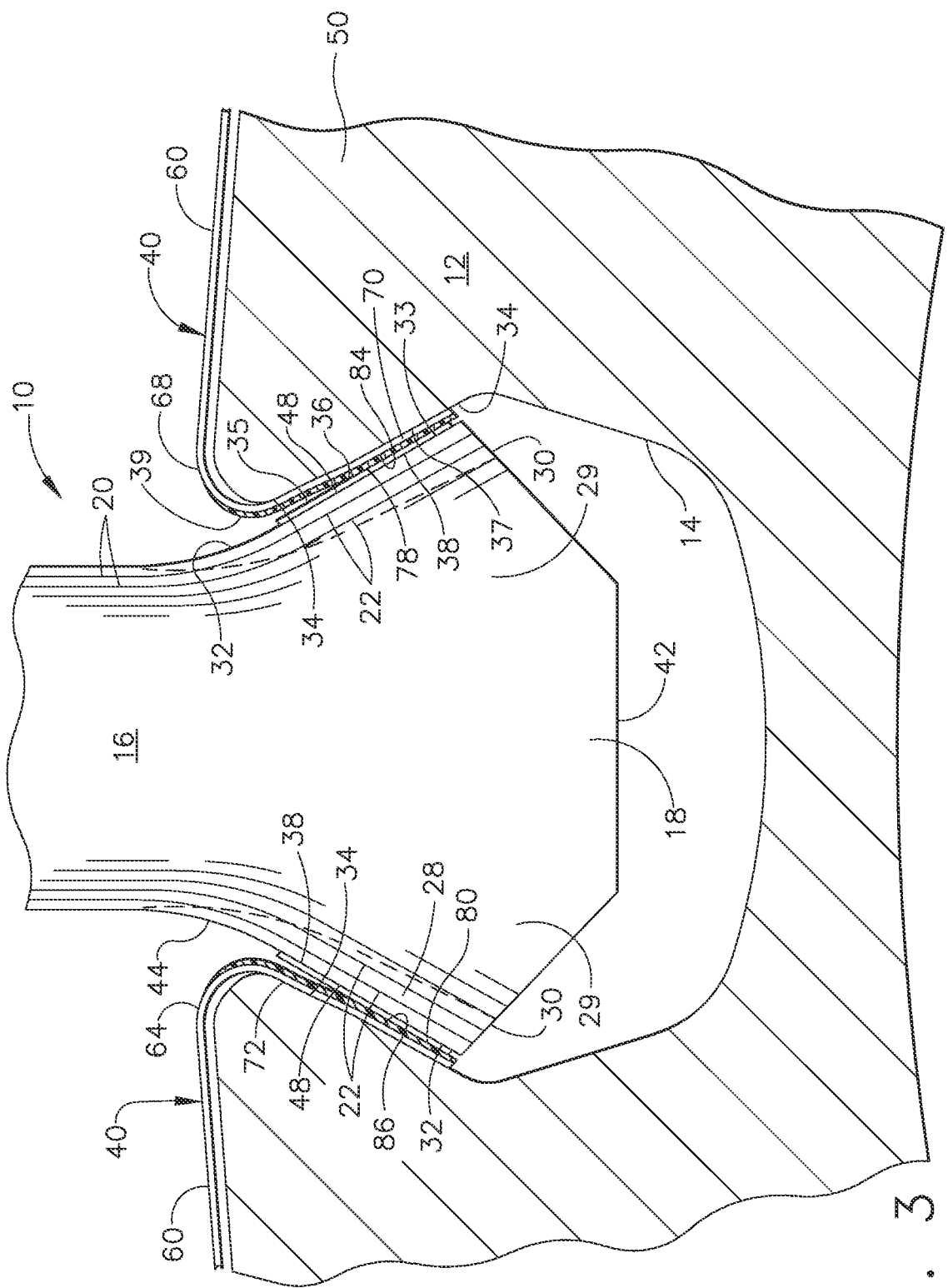
FIG. 3 is an enlarged fragmentary axial view illustration of the assembly of the blade root and shim in the dovetail slot illustrated in FIG. 2.

FIG. 1 is an exploded view illustration of a composite fan blade 10 carried by a supporting member, for example, a disk or drum of a gas turbine engine rotor 12 through a dovetail slot 14. The blade 10 is representative of a plurality of circumferentially disposed composite blades carried by a rotor in circumferentially disposed blade receiving dovetail slots 14. The blade 10 has a composite airfoil 16 and a splayed dovetail root 18 through which the blade is carried by the rotor 12. Referring further to FIGS. 2 and 3, the blade 10 includes a plurality of layed-up composite plies including a first plurality of structural and load carrying airfoil plies 20 in the airfoil and a second plurality of root plies 22 in the root 18. The root plies 22 are bonded together by a process well known in the art to form a pair of root outer pressure pads 28.

The composite blade 10 includes two of the non-metallic root outer pressure pads 28, one at each lobe 29 of the dovetail root 18, which are shaped to be carried by slot walls 34 of the dovetail slot 14. Pressure pad 28 includes a root end 30 extending along a radially inner portion of the root toward a root outer pressure face 32. Each one of the slot walls 34 cooperates with the outer pressure face 32 to carry the blade's dovetail root 18 when assembled. In the exemplary embodiment of the composite blade 10 disclosed herein, the blade root 18 including the outer pads 28 are designed as a function of stresses due to centrifugal forces expected to be experienced during engine operation.

The root outer pressure face 32 of the pressure pad 28 includes a radially inner surface 33, which cooperates in contact with dovetail slot wall 34 radially inward portion 37 when assembled. The root outer pressure face 32 also includes a radially outer surface 35, extending radially outwardly from a junction 36 between the pressure face inner and outer surfaces. The outer surface 35 is in spaced apart juxtaposition with dovetail slot wall radially outward portion 39, generally diverging radially outwardly from junction 36, for example, at a small angle such as in the range of about 1-2 degrees, beginning at the junction 36 of inner and outer surfaces 33 and 35. This feature is sometimes referred to as "crowning" with respect to the assembly of the blade and rotor and enables induced crush stresses, due to centrifugal force loading during operation of the rotor, to be dispersed in both the root pressure pad and the blade structural or airfoil plies along the full length of the pressure face 32 during operation. The centrifugal force load tends to move the inner surface 33 and the outer surface 35 towards one another.

A low friction wear coat 38 on the outer pressure face 32 of the blade root 18 is used to help reduce friction induced stresses in the blade root. Such a wear coat is typically applied to and cured on the pressure face 32. Examples of such a coating material include self lubricating films or cloths such as a fabric weave of polytetrafluoroethylene (PTFE) fibers, organic aramid fibers, or glass type fibers. See U.S. Pat. No. 5,573,377 for examples and some commercially available fabrics. Also, a spray of Teflon material or other forms of PTFE material can be used. The combination of the low friction coating with the above described "crowning" helps prevent the blades from becoming locked in the dovetail slot during deceleration of the rotor during operation.

A shim 40 is disposed between the low friction wear coat 38 and the slot wall 34 provides a desired hardness and surface finish to obtain still more improved performance from the low friction wear coat material, extends the life of the wear coat, and helps prevent wear from occurring to the slot wall. This feature is particularly important where the slot wall is a titanium alloy in which desired wear properties are not always achievable. The shim 40 is both replaceable and removable and fits over a top 49 of what is commonly referred to as a post 50 which makes up a portion of the slot wall 34. In the case of a rotor disk, the post is referred to as a disk post.

The shim 40 can be made of a single material such as steel, titanium or a titanium alloy or it can be a single material having a coating such as copper or a copper alloy on one side. In another form, the shim can be a bimetallic material such as a strip or sheet of an iron base alloy, for example, steel secured with a strip or sheet of a softer material, for example, copper or a copper alloy. In the example of a bimetallic shim having a relatively hard iron base alloy on one side and the relatively soft copper or copper alloy on the other side, the soft side is disposed opposite the slot wall to help prevent any relative motion between the slot wall and the shim, avoiding fretting or wear of the slot wall.

The exemplary shim disclosed herein includes material properties and surface finish on the side that opposes the low friction coat that improves performance of such a coating. The other side of the shim 40 that opposes the slot wall 34 and the rotor can be of a different material, which is sacrificial, so that the shim does not cause wear or fretting of the slot pressure faces. Use of a relatively soft material on the side of the shim that opposes such slot wall helps to prevent relative motion between the wall and the shim, preventing fretting or wear of the slot wall. Also, it forces substantially all motion to take place between the low friction wear coat and the shim, where the coefficient of friction is known, and the optimization of the blade root stresses can be fully utilized.

The shim includes a longitudinally extending base 60 having transversely spaced apart distal first and second ends 64, 68. Stress and weight relief holes 90 are disposed through the base 60 to help relieve stresses that might shorten the life of the shim 40. Circumferentially or transversely spaced apart longitudinally extending first and second legs 70, 72 extend away from the base 60 and are acutely angled inwardly towards and attached to the base 60. First and second outwardly facing surfaces 82, 84 of the first and second legs 70, 72 face and contact the outer pressure faces 32 of adjacent ones of the blade root 18. First and second inwardly facing surfaces 86, 88 of the first and second legs 70, 72 face and contact adjacent ones of the slot walls 34 of the dovetail slot 14. First and second low coefficient of friction coatings 78, 80 may be disposed on the first and second outwardly facing surfaces 82, 84. Among low coefficient of friction coatings suitable for use on the shim 40 are polytetrafluoroethylene powder dispersed in a resin binder and other coatings which include polytetrafluoroethylene.

Figure 4:
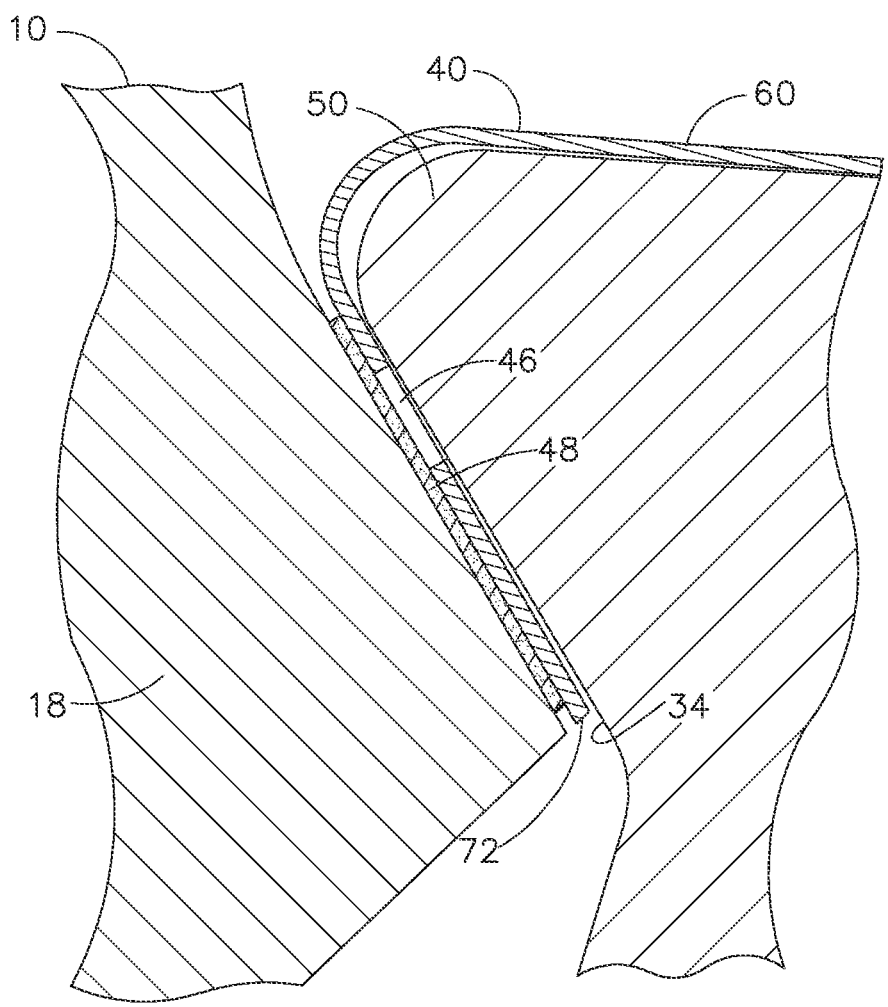
FIG. 4 is an enlarged view illustration of legs extending from a base of the shim illustrated in FIG. 3.

Referring to FIGS. 1, 2, and 4, composite fan blades 10 in the aircraft engine are subject to large centrifugal loads at the steady-state operating conditions. A stress concentration may be located in highly stressed areas 48 of the root outer pressure face 32 between a bottom end 42 of the dovetail root 18 and a top end 44 of the dovetail root. The stress concentration may be a limiting factor for composite fan blade life and durability. The shim 40 is provided with one or more apertures 46 in the longitudinally extending first and second legs 70, 72 to reduce this stress concentration and improve fatigue and durability of the composite fan blade. In an embodiment, the apertures 46 are positioned over the highly stressed areas 48 of the root outer pressure face 32 between the bottom end 42 of the dovetail root 18 and the top end 44 of the dovetail root.

Figure 5:
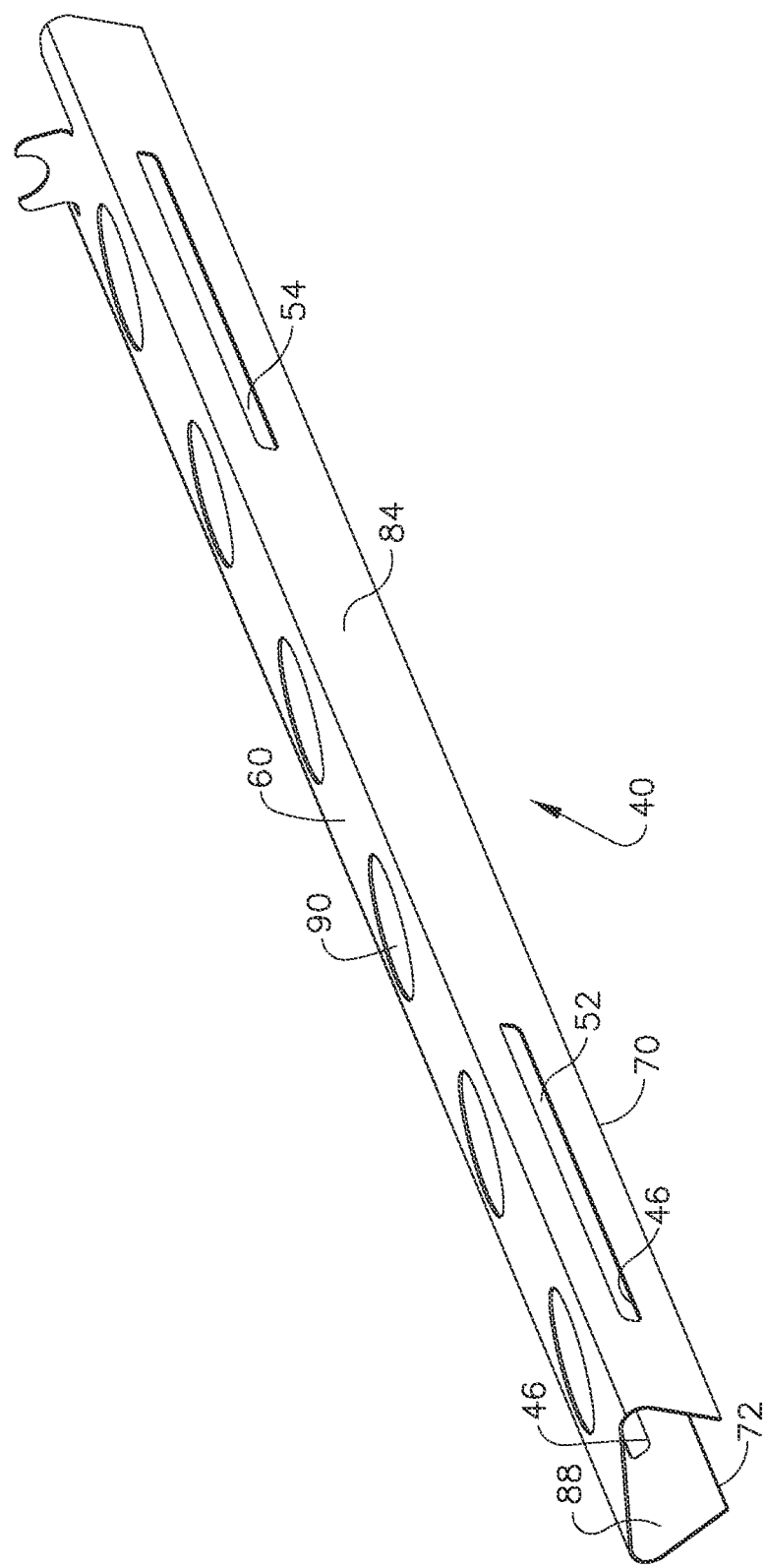
FIG. 5 is a perspective view illustration of the shim in the assembly of FIG. 1.
Figure 6:
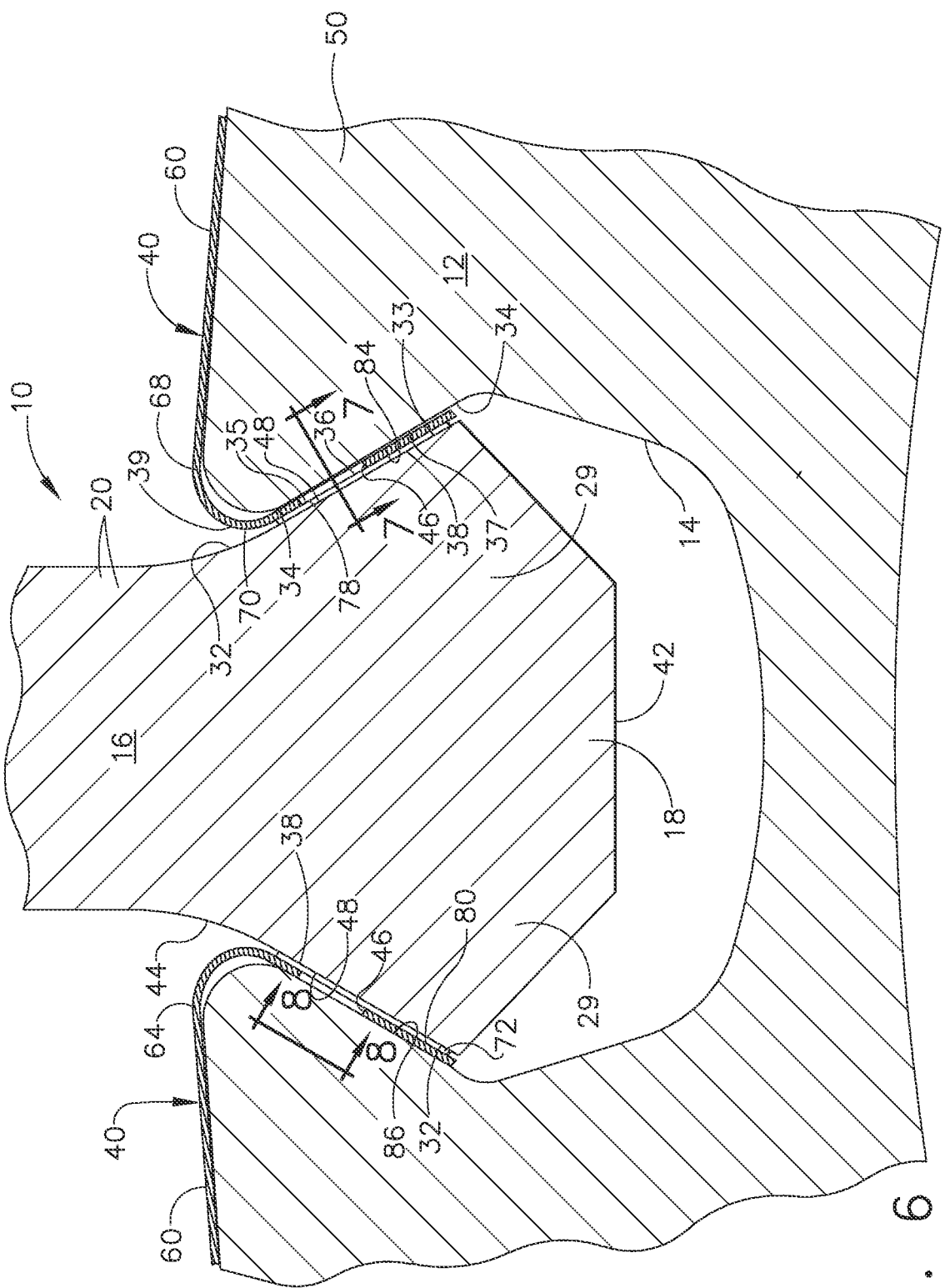
FIG. 6 is a cross sectional view illustration of the blade root and shim in the dovetail slot through 6-6 in FIG. 2.

A first exemplary embodiment of the apertures 46 is illustrated in FIGS. 1 and 5 and includes longitudinally spaced apart and longitudinally extending forward and aft slots 52, 54 disposed through each of the first and second legs 70, 72. The slots may be rectangular in shape and longitudinally elongated as illustrated herein. The apertures 46 or the forward and aft slots 52, 54 may have rounded edges 56 along the first and second outwardly facing surfaces 82, 84 of the first and second legs 70, 72 respectively as illustrated in FIGS. 6-8. The apertures 46 or the forward and aft slots 52, 54 may also have rounded corners 58 between the first and second outwardly facing surfaces 82, 84 and the first and second inwardly facing surfaces 86, 88 respectively of the first and second legs 70, 72 respectively as illustrated in FIGS. 6-8. The edges 56 on the blade contact surfaces and the first and second outwardly facing surfaces 82, 84, are rounded for contact stress release. The shim 40 can be punched from blade side, the first and second outwardly facing surfaces 82, 84, to the disk side and first and second inwardly facing surfaces 86, 88. The four corners of each shim aperture may be rounded for stress release.

Figure 9:
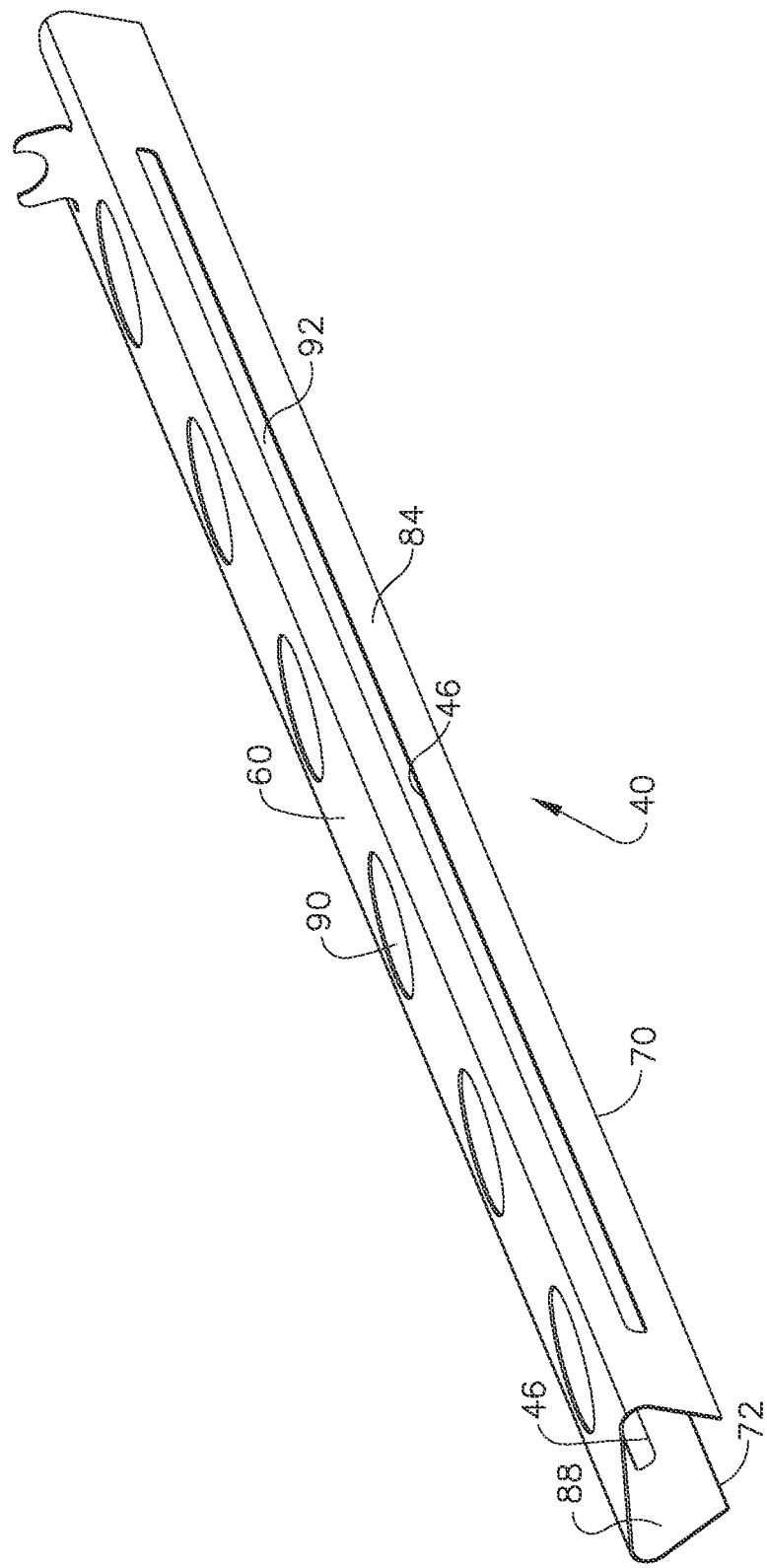
FIG. 9 is a perspective view illustration of an alternative shim with a single aperture for the assembly of FIG. 1.

Other shapes, sizes, and arrangements of the apertures or the slots may be used such as a single elongated slot 92 disposed through each of the longitudinally extending first and second legs 70, 72 as illustrated in FIG. 9. The forward and aft slots 52, 54 or others can be different in each of the first and second legs 70, 72. However, the same number, shapes, sizes, and arrangements of the apertures or the slots must be the same on the first and second legs 70, 72 of each shim 40 for blade balance. Thus, for example, the shape, size, and location of forward and aft slots 52, 54 must be the same on both the first and second legs 70, 72 but need not be the same on each one of the first and second legs 70, 72.

The shim 40 with the one or more apertures on each of the extending first and second legs 70, 72 may decrease the stress concentration level by re-distributing the loads to broader areas. It may improve both high cycle fatigue and low cycle fatigue of the composite fan blade. It is particularly useful in decreasing high flatwise tensile stress located between the bottom and top ends 42, 44 of the dovetail root 18.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:
1. A gas turbine engine blade root shim comprising:
a longitudinally extending base having distal first and second transversely spaced apart ends,
transversely spaced apart first and second longitudinally extending legs extending away from the base and acutely angled inwardly towards the base from the first and second ends respectively,
one or more apertures disposed through each of the longitudinally extending first and second legs, wherein each aperture of the one or more apertures is defined within a first or second leg between the base and the first and second ends respectively and wherein the one or more apertures are defined as one or more longitudinally elongated and extending rectangular slots are positioned within each of the longitudinally extending first and second legs, and one or more relief holes disposed through the base, wherein the one or more longitudinally elongated and extending rectangular slots comprise a longitudinal dimension greater than a longitudinal dimension of the one or more relief holes.

2. The shim as claimed in claim 1, further comprising first and second coatings on first and second outwardly facing surfaces of the longitudinally extending first and second legs, wherein each of the first and second coatings have a coefficient of friction that is lower than the respective first and second outwardly facing surfaces.

3. The shim as claimed in claim 2, wherein the coatings include polytetrafluoroethylene powder dispersed in a resin binder.

4. The shim as claimed in claim 2, wherein the coatings include polytetrafluoroethylene.

5. The shim as claimed in claim 1, wherein the apertures have rounded edges along first and second outwardly facing surfaces of the first and second legs respectively.

6. The shim as claimed in claim 5, wherein the apertures have rounded corners between the first and second outwardly facing surfaces and first and second inwardly facing surfaces respectively of the first and second legs respectively.

7. The shim as claimed in claim 6, further comprising first and second coatings on the first and second outwardly facing surfaces of the longitudinally extending first and second legs, wherein each of the first and second coatings have a coefficient of friction that is lower than the respective first and second outwardly facing surfaces.

8. The shim as claimed in claim 7, wherein the coatings include polytetrafluoroethylene powder dispersed in a resin binder.

9. The shim as claimed in claim 7, wherein the coatings include polytetrafluoroethylene.

10. The shim as claimed in claim 1, wherein the apertures have rounded corners between first and second outwardly facing surfaces and first and second inwardly facing surfaces respectively of the first and second legs respectively.

11. The shim as claimed in claim 1, wherein the one or more apertures are defined as one or more longitudinally extending slots within each of the longitudinally extending first and second legs.

12. The shim as claimed in claim 1, further comprising first and second coatings on first and second outwardly facing surfaces of the longitudinally extending first and second legs, wherein each of the first and second coatings have a coefficient of friction that is lower than the respective first and second outwardly facing surfaces.

13. The shim as claimed in claim 12, wherein the coatings include polytetrafluoroethylene powder dispersed in a resin binder.

14. The shim as claimed in claim 12, wherein the coatings include polytetrafluoroethylene.

15. The shim as claimed in claim 1, wherein the rectangular slots are defined within rounded edges along first and second outwardly facing surfaces of the first and second legs respectively and rounded corners between the first and second outwardly facing surfaces and first and second inwardly facing surfaces respectively of the first and second legs respectively.

16. The shim as claimed in claim 15, further comprising first and second coatings on first and second outwardly facing surfaces of the longitudinally extending first and second legs, wherein each of the first and second coatings have a coefficient of friction that is lower than the respective first and second outwardly facing surfaces.

17. The shim as claimed in claim 16, wherein the coatings include polytetrafluoroethylene.

18. A rotor assembly comprising:
a plurality of composite fan blades carried by a rotor as a support member, each of the composite fan blades including a plurality of bonded composite airfoil plies of an airfoil and a blade root shaped to be carried by the rotor;
the rotor including a plurality of circumferentially disposed blade root receiving slots, each of the slots having a slot wall at least a portion of which is shaped to receive the blade root, and the slot wall shaped to receive and carry at least a portion of a root outer pressure face of the blade root;
a longitudinally extending shim carried by the slot wall and including transversely spaced apart first and second longitudinally extending legs extending away from a longitudinally extending base and acutely angled inwardly towards the base from the first and second ends respectively, and
one or more apertures disposed through each of the longitudinally extending first and second legs, wherein each aperture of the one or more apertures is defined within a first or second leg between the base and the first and second ends respectively, and wherein the one or more apertures are defined as one or more longitudinally elongated and extending rectangular slots are positioned within each of the longitudinally extending first and second legs, and
one or more relief holes disposed through the base, wherein the one or more longitudinally elongated and extending rectangular slots comprise a longitudinal dimension greater than a longitudinal dimension of the one or more relief holes.

19. The rotor assembly as claimed in claim 18, wherein the apertures are defined as one or more longitudinally extending rectangular slots, and the rectangular slots have rounded edges along first and second outwardly facing surfaces of the first and second legs respectively and rounded corners between the first and second outwardly facing surfaces and first and second inwardly facing surfaces respectively of the first and second legs respectively.

20. The rotor assembly as claimed in claim 19, further comprising first and second coatings on the first and second outwardly facing surfaces of the longitudinally extending first and second legs, wherein each of the first and second coatings have a coefficient of friction that is lower than the respective first and second outwardly facing surfaces.

21. The rotor assembly as claimed in claim 20, wherein the coatings include polytetrafluoroethylene.

* * * * *